United States Patent [19]

Gabriel et al.

[11] 3,775,747

[45] Nov. 27, 1973

[54] AN ERROR CORRECTING ENCODER

[75] Inventors: Malcolm Edward Gabriel, Basildon, England; David John Anderson, Eemnes, Netherlands

[73] Assignee: International Standard Electric Corporation, New York, N.Y.

[22] Filed: Oct. 17, 1972

[21] Appl. No.: 299,509

[52] U.S. Cl. . 340/146.1 R, 179/15 AE, 179/15 AP, 325/38 R

[51] Int. Cl. .......................................... H03k 13/34

[58] Field of Search .................. 179/15 AE, 15 AP; 325/38 R, 41, 42; 340/347 AD, 146.1 R

[56] References Cited

UNITED STATES PATENTS

| | | | |
|---|---|---|---|
| 3,530,459 | 9/1970 | Chatelon | 179/15 AP |
| 3,638,219 | 1/1972 | Harms et al. | 325/38 R |
| 3,707,680 | 12/1972 | Gabbard et al. | 179/15 AE |
| 3,723,879 | 3/1973 | Kaul et al. | 325/38 R |

*Primary Examiner*—Charles E. Atkinson
*Attorney*—C. Cornell Remsen, Jr. et al.

[57] ABSTRACT

This relates to an error correcting PCM encoder. The encoder is of the feedback comparison type. Logic circuitry is employed to make error corrections toward the end of the encoding cycle. The encoder receives an analog input signal carrying information to be coded. The encoder produces an initial code signal representative of the information to be coded. An analog replica of the initial code signal is compared with the analog input signal. An error signal is produced if the analog input signal and the analog replica of the initial code signal differ. The initial code signal is corrected in response to the error signal to produce an error corrected output code signal.

15 Claims, 14 Drawing Figures

ERROR CORRECTING ENCODER

BACKGROUND OF THE INVENTION

This invention relates to error correcting PCM (pulse code modulation) encoders.

Coders of this type encode successive samples of input signals which carry information into the code used which is usually a binary code or a code derived therefrom.

One method of encoding the information is by successive comparison of a series of reference signals with an analog input signal, each comparison being followed by the subtraction of the reference signal from the input signal. If the reference signal is larger than the input signal a digit of the code representing the reference signal is transmitted. This process is continued until the remainder of the input signals is less than the smallest reference signal used.

Encoders whether of this type or other known types are inherently elaborate and are usually time shared between a number of information sources but the arrangements for sampling and multiplexing the information sources result in errors in the code produced.

SUMMARY OF THE INVENTION

An object of the present invention is to provide an error-correcting encoder particularly applicable to multiplexed systems.

A feature of the present invention is the provision of an error correcting encoder comprising: an encoder input for input analog signals having an information containing parameter to be encoded; first means to generate an initial code signal representative of the parameter; second means coupled to the first means to produce an analog replica of the initial code signal; third means coupled to the encoder input and the second means to produce an error signal when the analog replica and the input analog signals differ; and fourth means coupled to the first means and the third means responsive to the error signal to correct the initial code signal and produce an error corrected output code signal.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
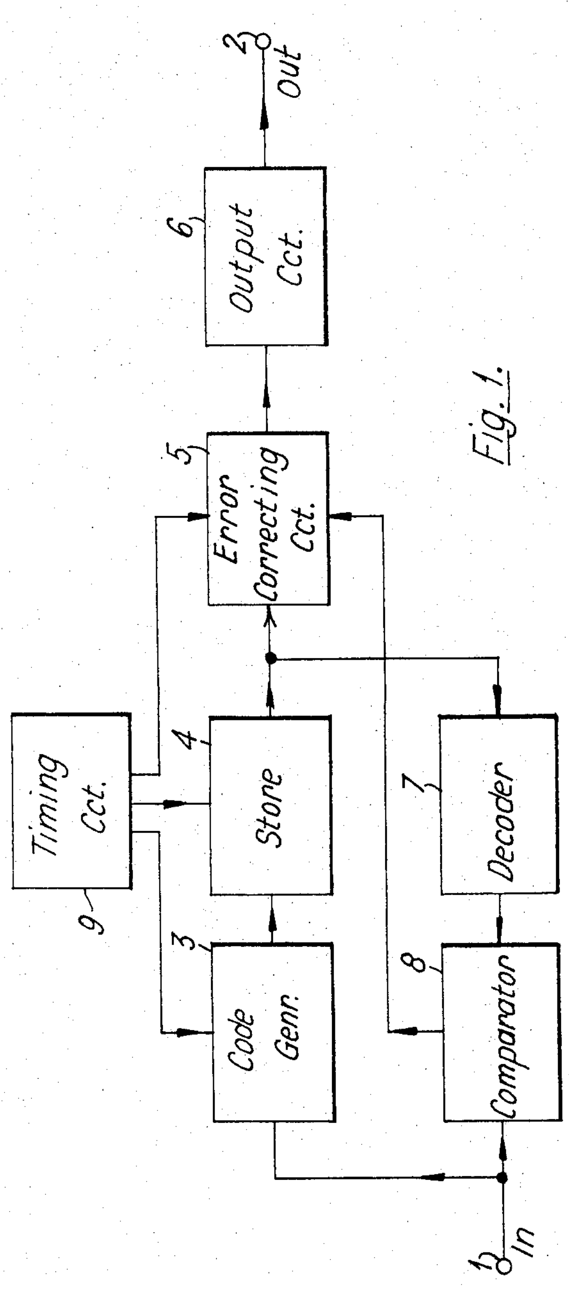
FIG. 1 is a block diagram of one embodiment of an error correcting encoder according to the principles of the present invention.

Referring to FIG. 1, the input signal to the encoder is applied via the terminal 1 to the first input of a comparator 8 and the input of a code generator 3. Code generator 3 is connected to a store 4 the output of which is connected via an error correcting circuit 5 to the output circuit 6 and also via a decoder 7 to a second input of comparator 8. The output of comparator 8 is connected to an input of error correcting circuit 5. A timing circuit 9 is connected to code generator 3, store 4 and correction circuit 5.

The operation of the encoder is cyclic, each cycle encoding a value of the parameter of the input analog signal which carries the information to be coded, the parameter in this embodiment being amplitude. The code, the initial code, is a digital signal produced by generator 3 in response to signals from timing circuit 9 and is stored in store 4. Decoder 7 decodes the stored signal, produces an analog of the initial code, and applies the decoded signal to comparator 8 which compares it to the input analog signal and produces error signals which are applied to error correcting circuit 5. Circuit 5 corrects the code in the store and in response to signal from the timing circuit applies the corrected code to the output terminal 2 of the encoder.

Circuits suitable for use in the individual blocks may be assembled from known logic elements and the details of output circuit 6, coder 7 and comparator 8 are not described further herein.

Figure 2:
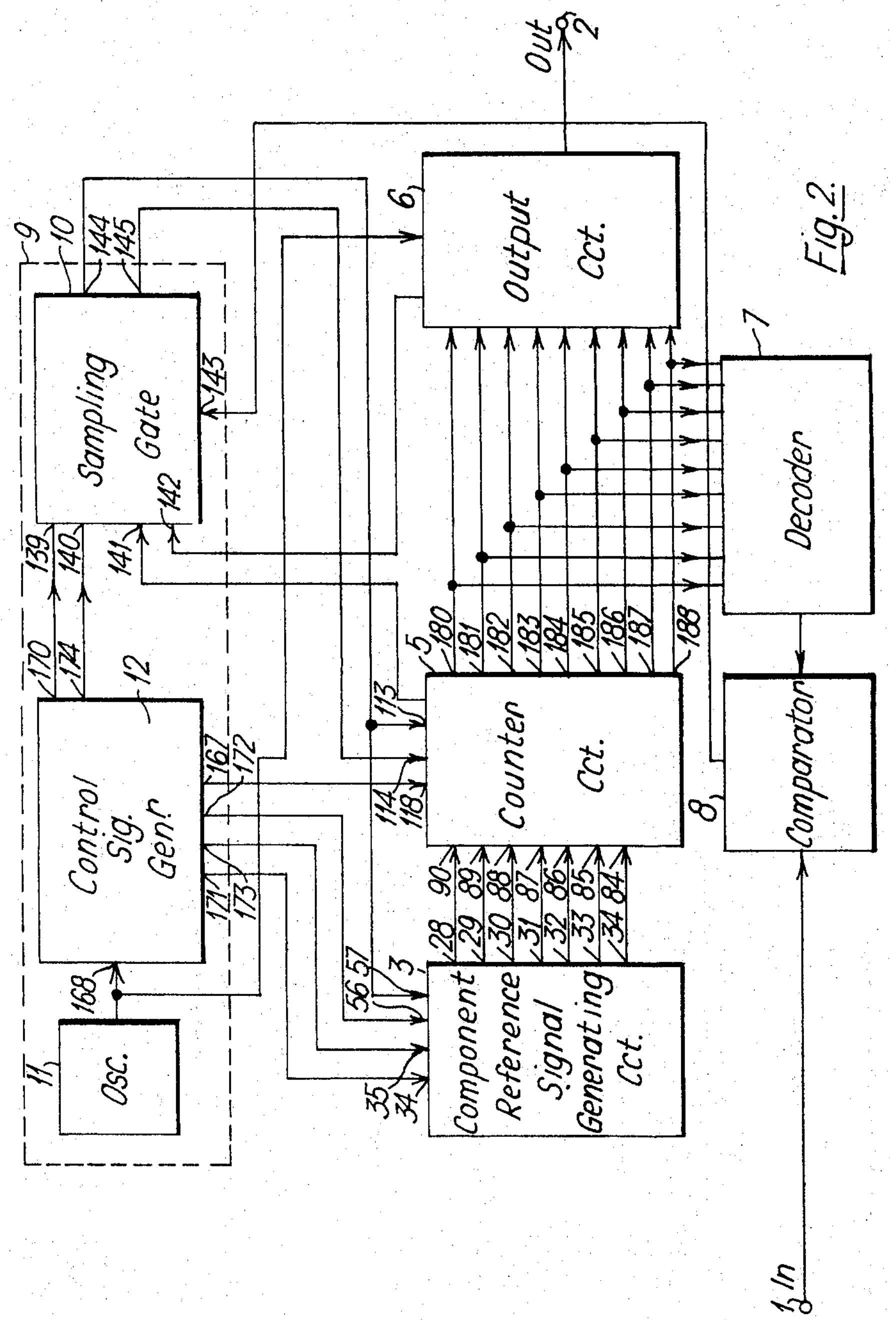
FIG. 2 is a block diagram of an alternative embodiment of an error correcting encoder according to the principles of the present invention.

It is not essential that the encoder input be connected to the code generator, the code signal generated may be used as a reference signal and compared to the input signal, the code signal being modified by the correction cicuit before the transmission. Referring to FIG. 2 this shows the block diagram of an alternative embodiment of the invention in which an analog signal produced from the code generated, the initial code, is compared to the input analog signal. The encoding cycle has two parts. In the first part the digits of an eight digit binary code which correspond to decreasing values of amplitude are produced successively and stored when the input signal amplitude is greater than the analog signal. In the second part of the cycle the code is corrected if necessary. Five correction operations each of which change the code to a code with an increase or a decrease of the smallest completed step.

The blocks which correspond to the blocks of FIG. 1 have corresponding numbers. The timing circuit 9 comprises an oscillator 11, a control signal generator 12 and a sampling gate 10. The code generator 3 and the store 4 of FIG. 1 are combined in FIG. 2 as a component reference signal generator 3. Control signal generator 12 has two outputs 170 and 174 connected, respectively, to inputs 139 and 140 of sampling gate 10. Three further outputs 171, 173 and 172 are connected to three inputs numbered 34, 35 and 56 of component signal generator 3. An output 167 is connected to the control signal input 118 of counter circuit 5 which corresponds to error correcting circuit 5 of FIG. 1. A further output from the oscillator is connected to the parallel-series convertor of output circuit 6. Component reference signal generator 3 of FIG. 2 has seven outputs 28–34 connected, respectively, to seven inputs 90–84 of counter circuit 5. Counter circuit 5 has nine outputs numbered 180–188 connected both to respective inputs of decoder 7 and the inputs of output circuit 6 of FIG. 2. The output of decoder 7 is connected to a first input of comparator 8, the second input of which has the input 1 of the encoder connected thereto. The output of comparator 8 is connected to the input 143 of sampling gate 10 which has two outputs 144 and 145 which are connected, respectively, to control signal inputs 113 and 114 of counter 5. Output 144 is also connected to a control signal input 57 of component signal generator 4.

Figure 3:
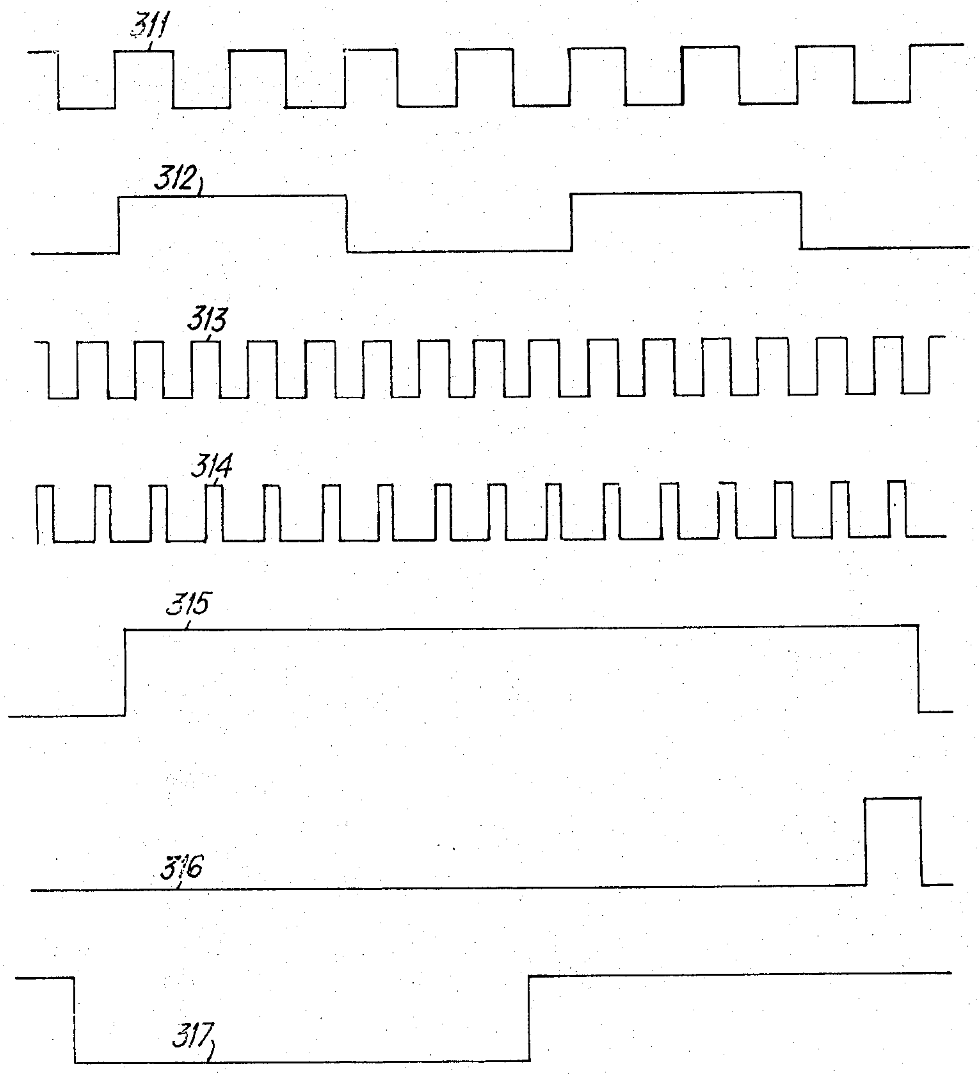
FIG. 3 illustrates idealized signal waveforms used to describe the operation of the error correcting encoder of FIG. 2.
Figure 4:
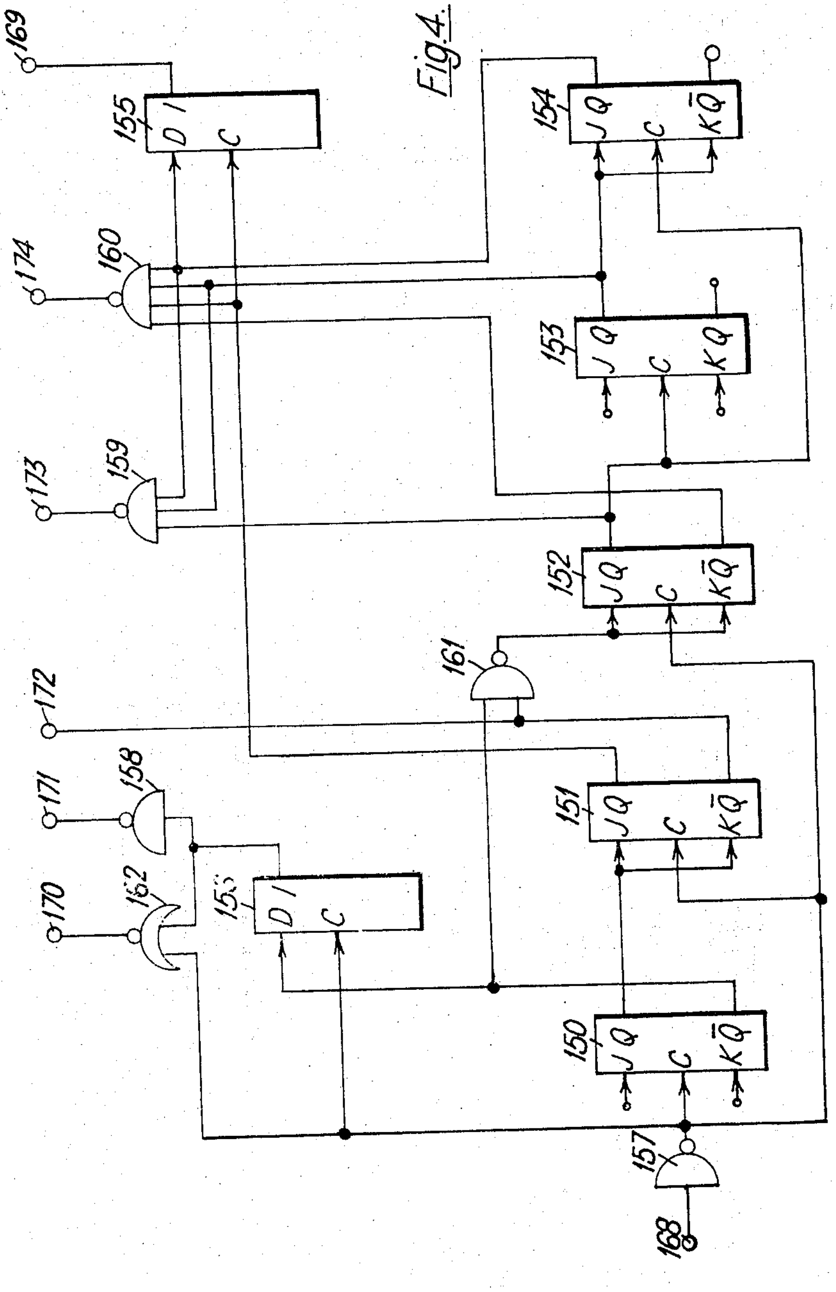
FIG. 4 is a logic diagram of a control signal generator suitable for use in the error correcting encoder of FIG. 2.

A circuit suitable for control signal generator 12 is shown in FIG. 4 and comprises five JK flip-flops 150 to 154, two D type flip-flops numbered 155 and 156, five NAND gates 157 and 161 and one NOR gate 162 interconnected as shown. The input terminal 168 is connected to the output of oscillator 11 which in this embodiment is 8.192MHz. Control signals having waveforms as illustrated in Curves 317, 314, 313, 311, 315 and 316 of FIG. 3 are obtained at the outputs 169 to 174, respectively.

Figure 5:
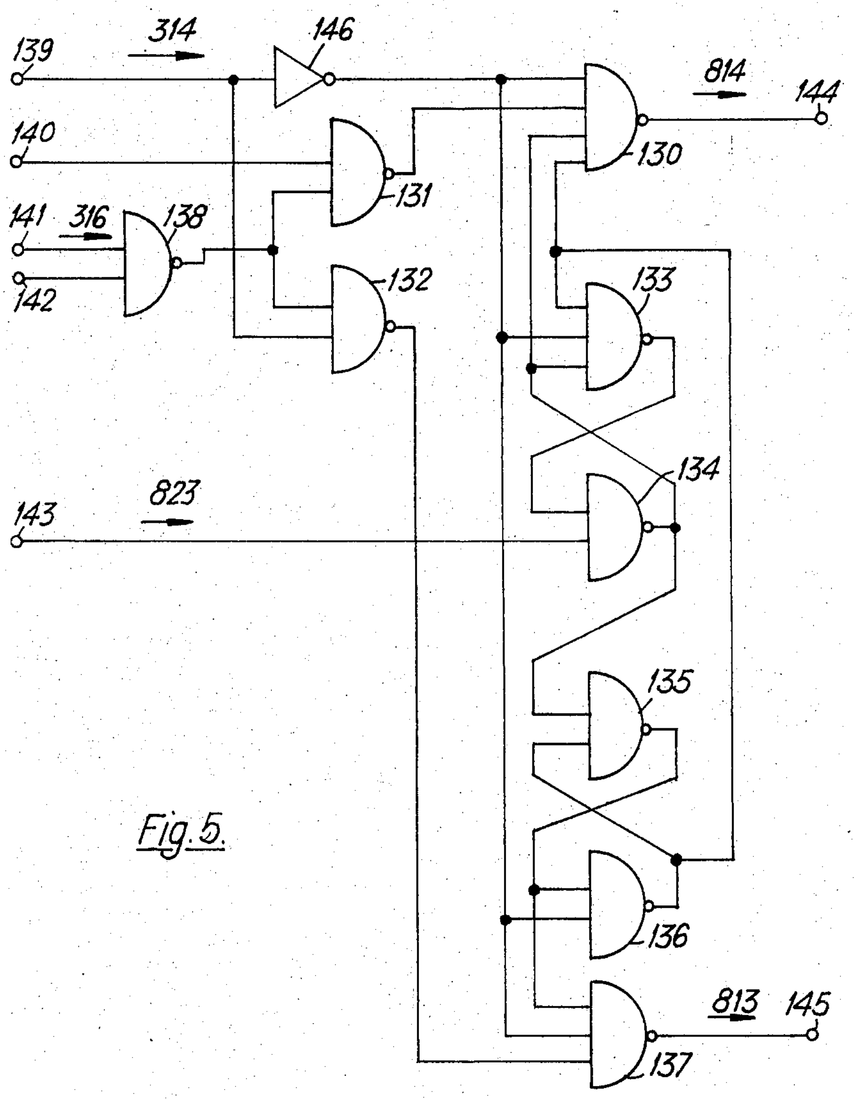
FIG. 5 is a logic diagram of a sampling gate suitable for use in the error correcting encoder of FIG. 2.

A circuit suitable for use as sampling gate 10 is illustrated in FIG. 5 and comprises nine NAND gates 130–138 and one invertor 146 interconnected as shown. The output signal 823 FIG. 8*b* of comparator 8 is applied via terminal 143 to an input of NAND gate 134 and the clock signal 314 of FIG. 3 from control signal generator 12 is applied via terminal 139 to NAND gate 130 via inverter 146 and also to NAND gate 132. A polarity bit signal described later is applied via input 140 to NAND gate 130 via NAND gate 131. The signal 316 of FIG. 3 from counter 5 and an inhibiting signal from the output circuit is applied to NAND gate 138. The pairs of NAND gates 133, 134 and 135, 136 are interconnected to form a pair of bistable circuits having as respective slaves NAND gates 130 and 137. The slaves are clocked by the signal 314 at the output of inverter 146 and each has an extra inhibitory input to which is applied a signal from the outputs of NAND gates 131 and 132.

In response to the clocking signal 314 of FIG. 3 and the error signal which is the output signal of comparator 8 sampling gate 10 produces a succession of output signals 813 or 814 of FIG. 8*b*, the signals 814 are count down signals produced when the amplitude of the output signal of decoder 7 is below the amplitude of the input signal at the encoder input 1 and the signals 813 are count up signals produced when the amplitude is above the decoder output amplitude. The count up signals are inhibited when the polarity bit signal indicates a positive input signal and the count down pulses are inhibited when the absence of the polarity bit indicates a negative input signal.

Figure 6:
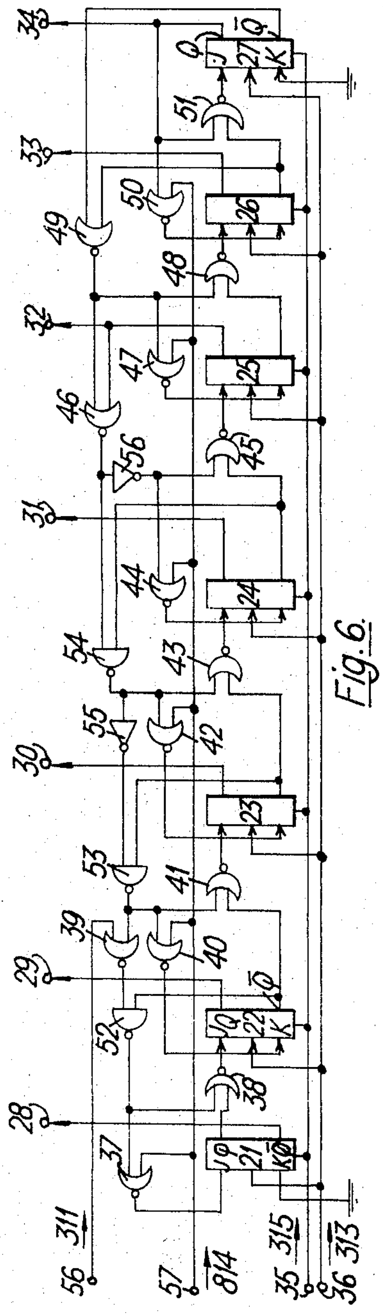
FIG. 6 is a logic diagram of a component reference signal generator suitable for use in the error correcting encoder of FIG. 2.

A schematic circuit suitable for use as the component reference signal generator 3 is shown in FIG. 6 and in this embodiment produces seven component reference signals which correspond to the first seven digits of the code at outputs 28 to 34. The circuit comprises seven JK flip-flops 21 to 27 which have their J and K outputs and their Q and Q′ outputs interconnected via fifteen NOR gates 37 to 51, three NAND gates 52 to 54 and two inverters 55 and 56 as shown in FIG. 6. The K inputs of the JK flip-flop 21 and 27 are earthed. A control signal 311 shown in FIG. 3 is fed into this interconnection via the terminal 56 as one of the inputs of NOR gate 39. The output signal 814 from output 144 of sampling gate 3 is also applied via terminal 57 as one input of each of the NOR-gates 37, 40, 42, 44, 47 and 50. The clock signal 313 of FIG. 3 is applied to the clock inputs of all seven flip-flops via terminal 36 and the reset signal 315 of FIG. 3 is applied to all the reset inputs of the flip-flops via terminal 35. The signal at the output 28 is obtained from the $\overline{Q}$ of flip-flop 21 and the signals at the outputs 29, 30, 31, 32, 33 and 34 from the respective Q outputs of flip-flops 22, 23, 24, 25, 26 and 27.

The array of seven flip-flops 21 to 27 have logic interconnections to the J and K inputs as follows:

| Flip-flop | J input | K input |
|---|---|---|
| 21 | logical 0 | $X_d.\ (\overline{B+C+D+E+F+G})$ |
| 22 | $A.\ (\overline{B+C+D+E+F+G})$ | $X_d.\ (\overline{C+D+E+F+G})$ |
| 23 | $B.\ (\overline{C+D+E+F+G})$ | $X_d.\ (\overline{D+E+F+G})$ |
| 24 | $C.\ (\overline{D+E+F+G})$ | $X_d.\ (\overline{E+F+G})$ |
| 25 | $D.\ (\overline{E+F+G})$ | $X_d.\ (\overline{F+G})$ |
| 26 | $E.\ (\overline{F+G})$ | $X_d.\ (\overline{G})$ |
| 27 | F. G | logical 0 |

,where A to F are the output of flip-flop 21 to 27, and D is the signal from the sampling gate.

In an N bit encoder (N—1) flip-flops are required and for any flip-flop $\Phi_n$ the inputs are:

$$J\ \text{input} = \Phi_{n-1}.\ (\overline{\Phi_n + \Phi_{n-1} + \Phi_{n-2} + \ldots \Phi_N})$$

$$K\ \text{input} = X_d;\ (\overline{\Phi_{n+1} + \Phi_{n+2} + \ldots \Phi_N})$$

The operation of each flip-flop element is such that:

i. if the flip-flop is at logical 1 and subsequent flip-flops are all at logical 0, any D signal occurring when the clock signal enables the J & K inputs will cause a 1 to 0 transition at the clocking edge of the clock wave form, so removing that component of the reference signal.

ii. if the flip-flop and following flip-flops are at logical 0 it will act as a shift register, and after application of a clock pulse will assume the state of the previous flip-flop.

iii. if any of the following flip-flops are set to logical 1 the flip-flop will be locked out, and will hold its state until the second part of the encoding cycle.

In response to the reset signal 315 of FIG. 3 flip-flops 21-27 are reset with the Q outputs low (logical 0) and $\overline{Q}$ outputs high (logical 1). In response to the first clock signal 313 of FIG. 3 occurring after resetting, flip flop 21 either retains its state if a D signal is present at input 56 or changes over if no D signal is present. Simultaneously, flip-flop 22 changes over. The operation is repeated in response to the next clock pulse 313 by flip-flops 22 and 23 and by flip-flops 23, 24, 25, 26 and 27 for the succeeding clock pulses.

The component signal generator therefore generates in succession in each encoding cycle seven components of the reference signals representing decreasing orders of amplitude and will act as store for those signals unless the output sampling gate is an 814 signal indicating that the sum of the component reference signals so far stored represents an amplitude which is below the amplitude of the input signal.

Figure 7:
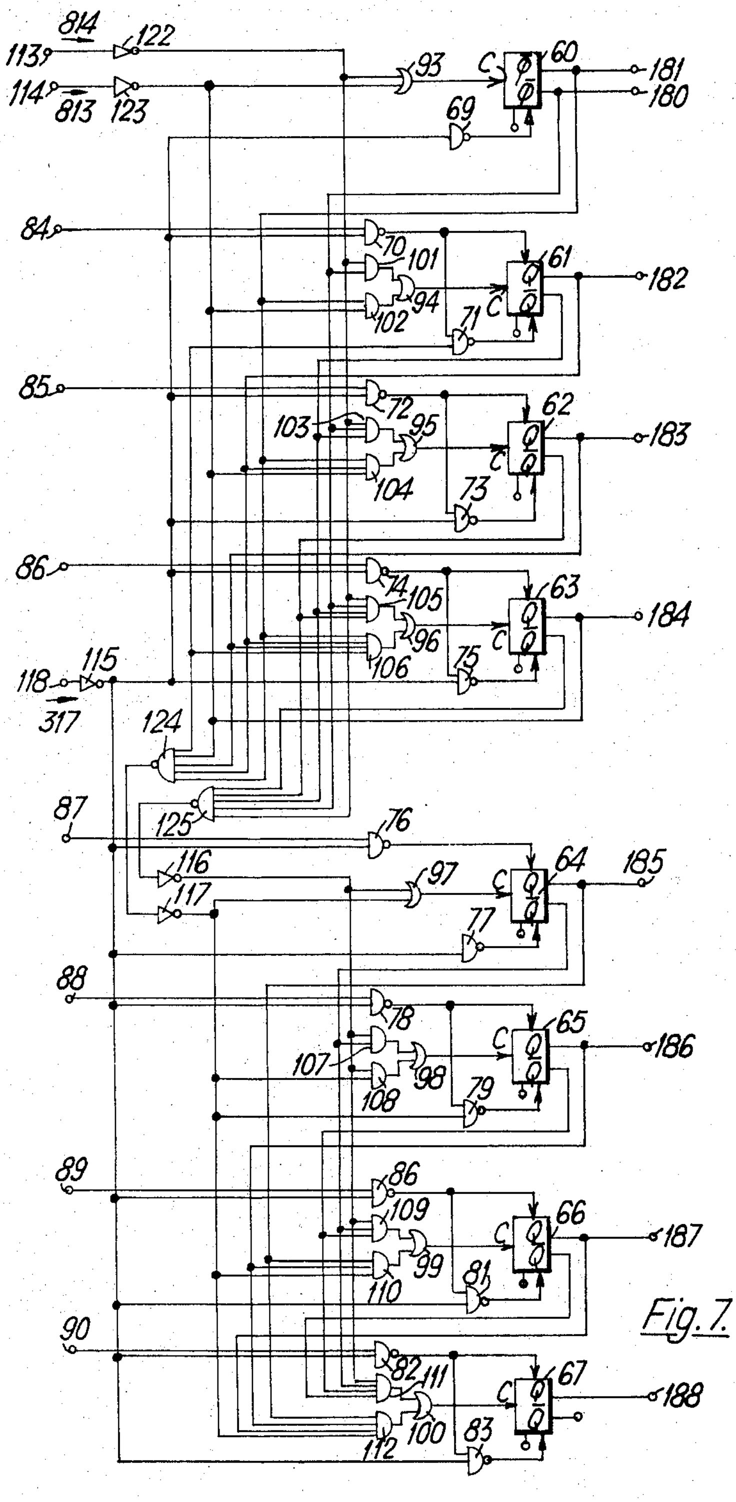
FIG. 7 is a logic diagram of a counter suitable for use in the error correcting encoder of FIG. 2.

A counter circuit which is suitable as an error correcting circuit is shown in FIG. 7 and consists of two four bit binary counters connected by the two NAND gates 124 and 125. Each four bit counter consists of four J–K toggle flip-flops 60 to 63 and 64–67, and input invertors 115, 116, 117 and 122, 123. Respective NAND gates 69, 71, 73, 75, 77, 79, 81 and 83 have one input connected via invertor 115 to input 118 and outputs connected respectively to the preset inputs of each flip-flop. The other input of each NAND gate is connected to a respective one of inputs 84–90. OR gate 93 connects the clock input of flip-flop 60 via invertors 122 and 123 to inputs 113 and 114. A combination of an OR gate and two AND gates 94, 101, 102; 95, 103, 104; 96, 105, 106; interconnected, the inputs 113 and 114 and the outputs of preceding flip-flops to the clock inputs of the other flip-flops 61–63. The OR gate 97 and the combination of OR gates 98-100 and AND gates 107–112 similarly interconnect the outputs of NAND gates 124 and 125 and the clock inputs of flip-flops 64–67. Each output from the component signal generator is applied to a respective input, these inputs being numbered 84 to 90.

The gate 124 is the carry output and provides a negative pulse when the first four bit counter reaches its maximum count state. The gate 125 is the borrow output and provides a negative pulse when the first four bit counter reaches it minimum state. These signals are applied to the input of the second four bit counter via the inverters 116 and 117. There is no connection to the J and K inputs of the flip-flop which operates in the toggle mode. The gates 93–100 combine the inputs signal and the flip-flop output signals and supply a signal to the toggle input of each of the flip-flops. The signals 814 and 813 are applied via inputs 113 and 114. The flip-flops are enabled when the load signal 317 of FIG. 3 applied to the input 118 is high. The three-set/clear NAND gates 68–83 are arranged in pairs so that when the input 118 is high (logical 1) the output of each flip-flop is the same as its input data regardless of the state of the clock input and when it is low (logical 0) the counter either counts down on a signal applied to input 113 or up on a signal applied to input 114. The counter in response to the load signal has the count set by the component reference signals stored by the component reference signal generator. In the second part of this cycle it produces the eighth reference signal and corrects the value indicated by the eight digits by the addition or subtraction of five further component reference signals of the lowest order each representing the smallest of the succession of reducing amplitudes as described later herein.

The encoder is controlled by timing circuit 9 to operate cyclically, each cycle encoding the amplitude of a sample of the input signal into eight-bit binary code. The two parts of the cycle are coding following by correction and the operation is illustrated in FIG. 8.FIGS. 8*a* and *b* show the waveforms with a steady input signal sample 811. FIGS. 8*c* and *d* show the waveforms when the input signal sample has a ripple at its commencement and FIGS. 8*e* and *f* show the waveforms when the input signal sample drops during the encoding process.

Figure 8A:
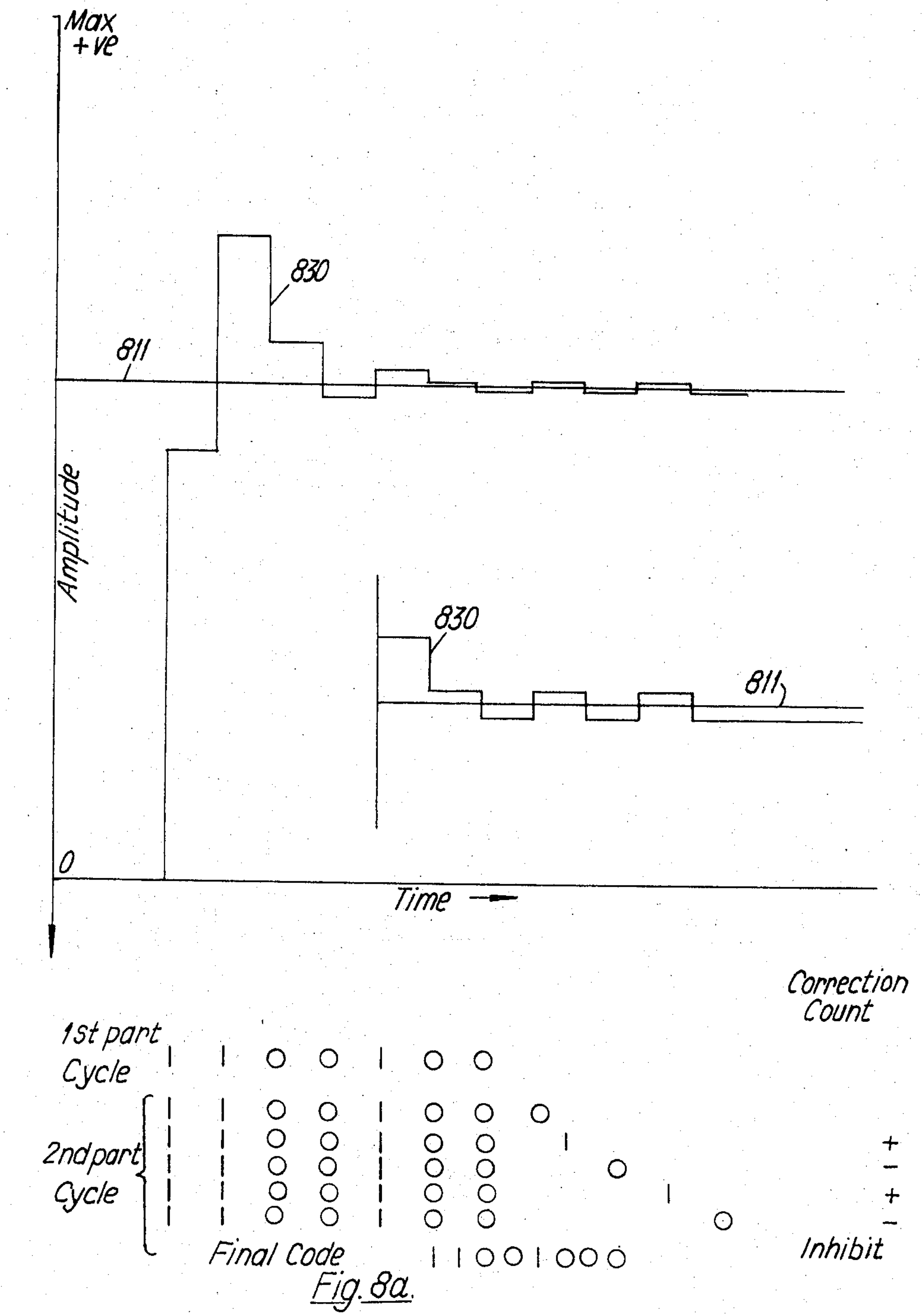
FIGS. 8*a* to *f* illustrates idealized signal waveforms occurring during the encoding cycle of the error correcting encoder of FIG. 2 employed to explain the operation thereof.
Figure 8B:
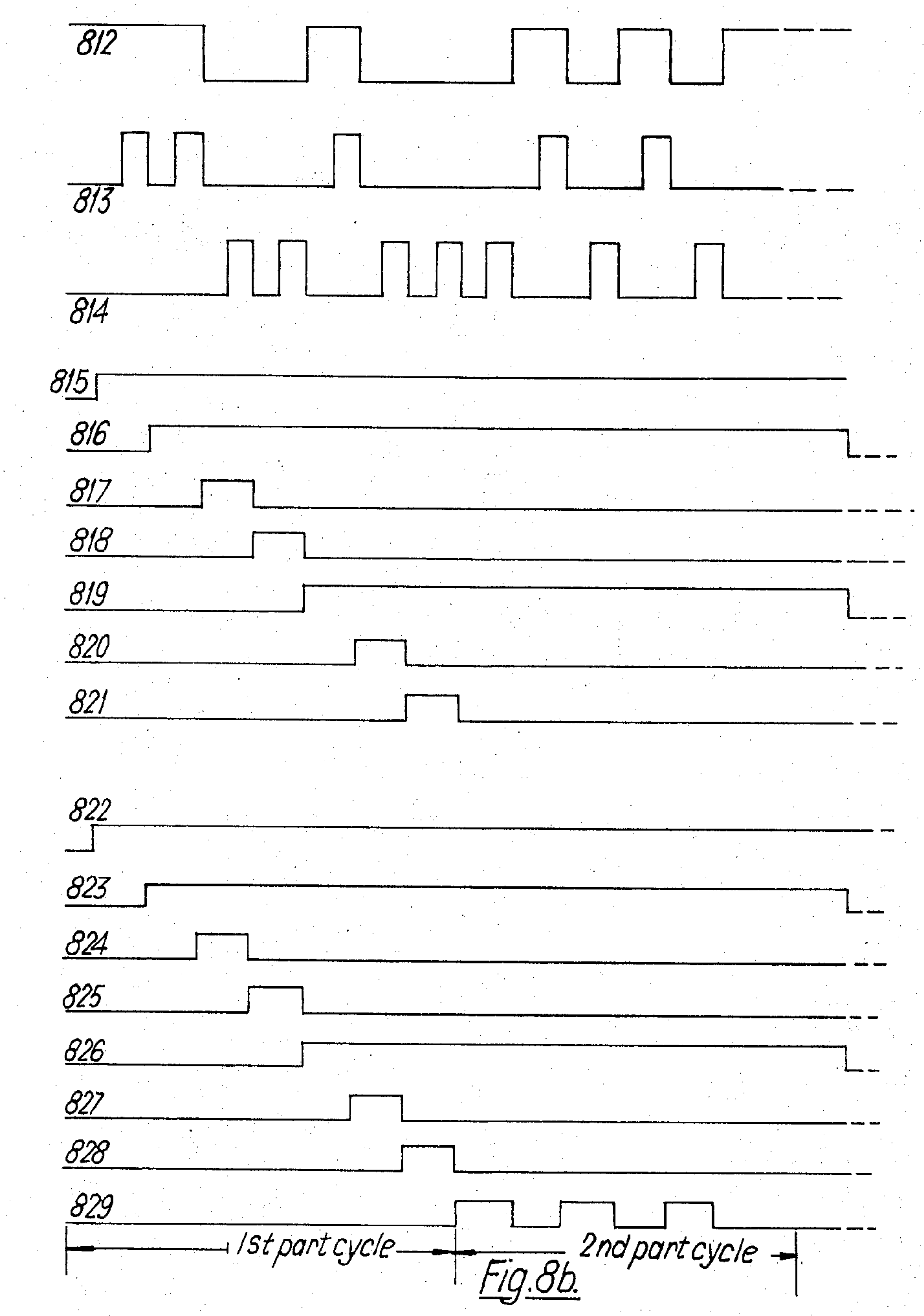
Figure 8C:
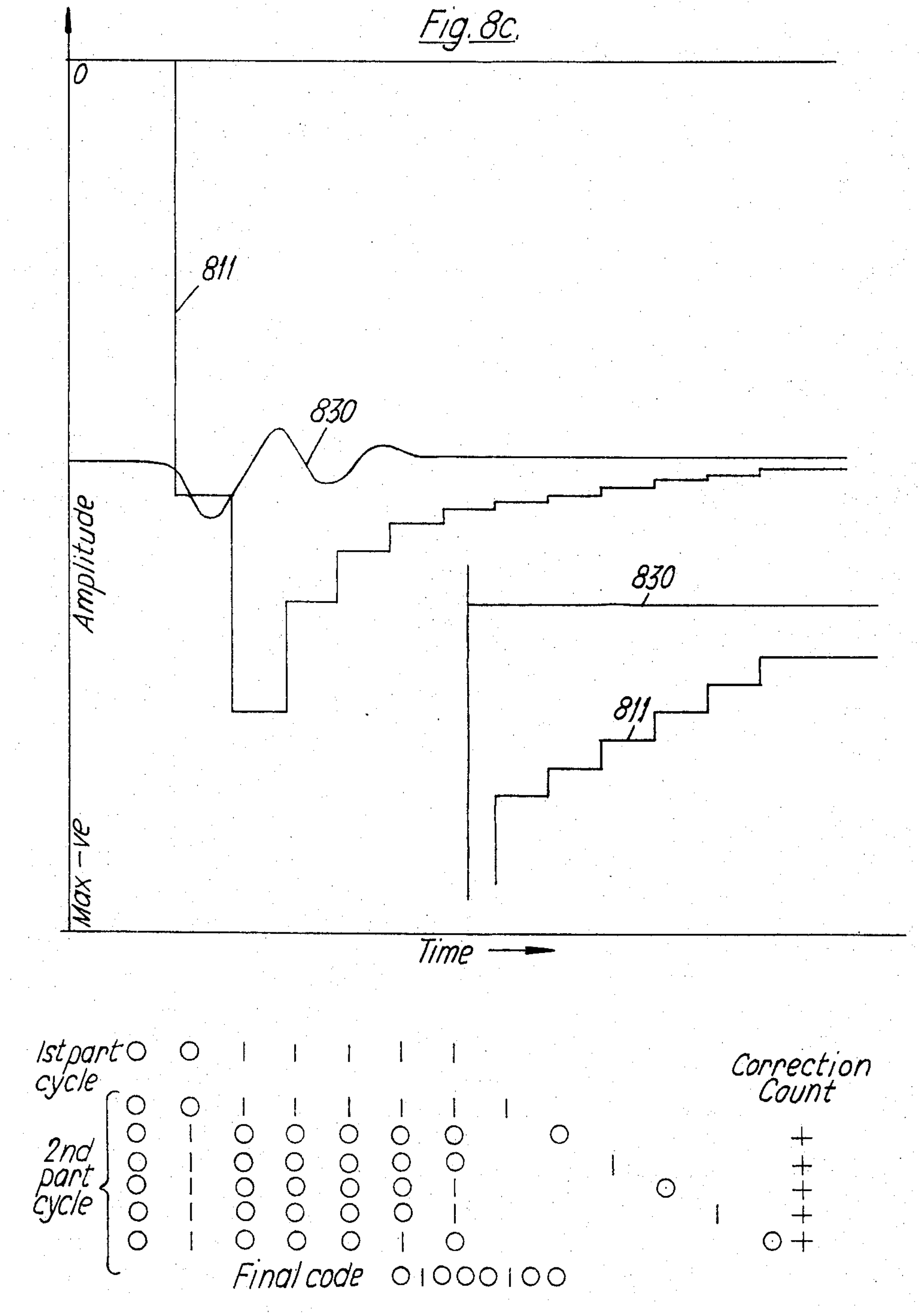
Figure 8D:
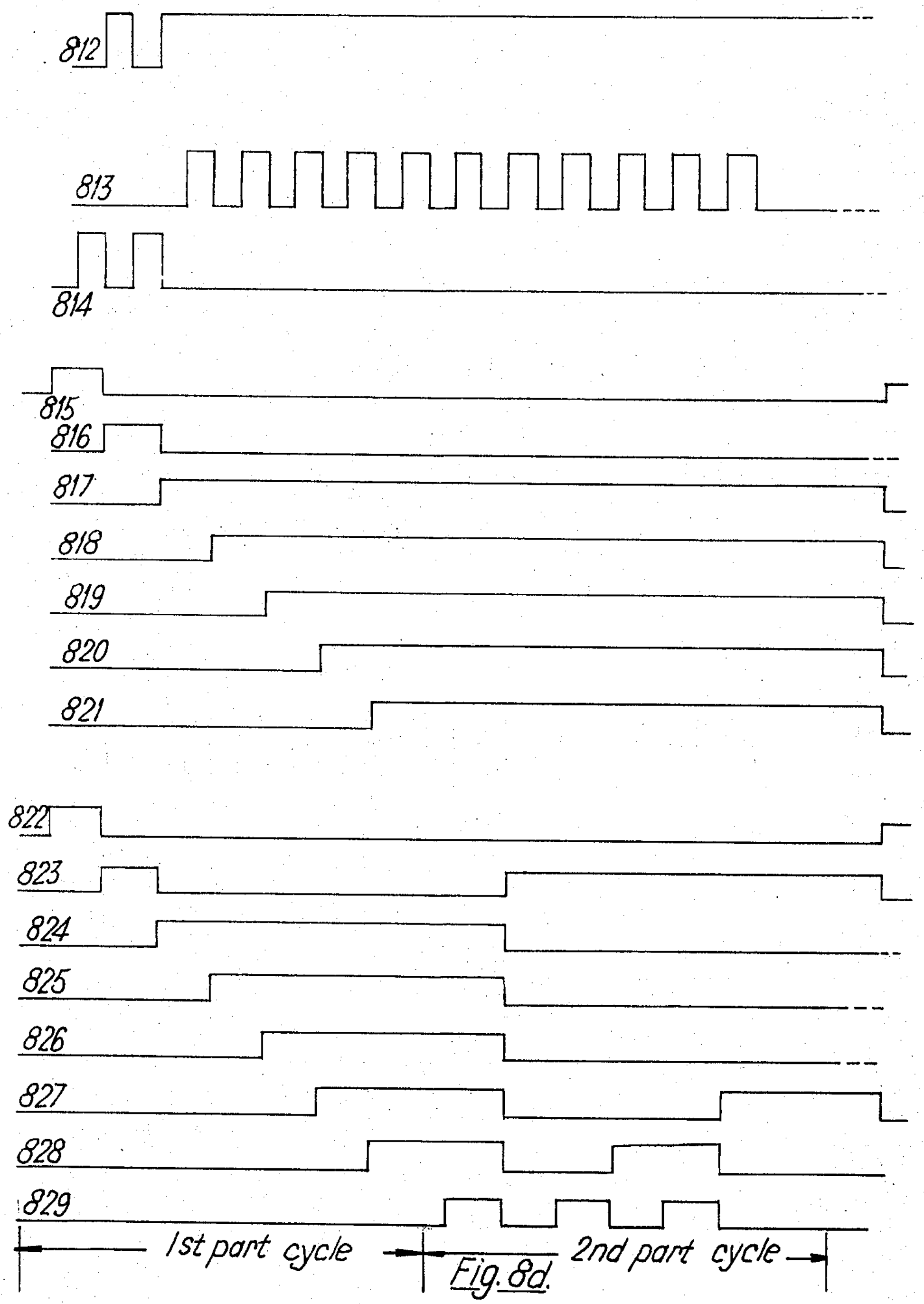

Referring to FIG. 8*a* the graph shows the amplitude of the input signal 811 and the analog signal 830 the second part of the cycle also being shown with an expanding amplitude scale. The tabulation illustrates the code generated and stored in the first part of the cycle and its subsequent correction in the second part of the cycle. Idealized waveforms which occur during the coding of the signal illustrated in FIG. 8*a* are shown in FIG. 8*b* in which 812 is the waveform of the output of comparator circuit 8, 813 and 814 are the count up signals 813 and count down signals 814 produced by sampling gate circuit 10, 815 to 821 are the waveforms of the signals at the seven-outputs 28–34 of component signal generator 3. The waveforms 822 to 829 are the waveforms of the outputs of nine-outputs 180–188 of counter circuit 5, where output 180 is the complement of the output 181.

At the start of the encoding cycle in response to the reset signal 316 of FIG. 3 the output signal 815 at output 28 goes to its high level (logical 1) so producing the highest order reference signal whilst the output signals 816 and 821 go to their low levels (logical 0). Considering FIGS. 8*a* and 8*b*, the first pulse of the waveform 813 is produced by the comparator in response to the positive level of the waveform 811 exceeding the output of the digital-to-analog convertor 830 produced in response to the level of signal 815. In response to a clock pulse the output 28 remains at the high level for the rest of the encoding cycle as shown in waveform 815 and simultaneously the signal 816 at output 29 representing the next lower order of reference signals is similarly retained at its high level until the end of the encoding cycle as shown in waveform 816 in response both to the next clocking pulse and the second pulse of the waveform 813 being produced because the level of signal 811 still exceeds signal 830. Simultaneously the waveform 817 is set to its high level. The first count down pulse of waveform 814 is produced in response to the low level of comparator which results because the level of signal 830 resulting from signals 815 and 816 is above signal 811. The output 30 returns to its low level in response to the third clocking pulse and retains this level to the end of the cycle since signal 814 is at its high level while simultaneously the waveform 818 is set to its high level. Similarly waveform 818 to 821 are set to the high level and either retained at that level in response to the pulses of signal 813 or reduced to their low level in response to the pulse of waveform 814. During the first half of the encoding cycle the outputs 815 to 821 are applied to the counter circuit and the outputs 810 to 817 of the counter circuit have corresponding waveforms shown in 822 and 828. The counter is therefore already set and registering seven of its eight digits of the binary code.

In the second part of the cycle the eighth and smallest digit is produced and the code is corrected by the counter counting one unit up in response to a count up pulse in signal 813 or down in response to a count down pulse in signal 814 so producing an initial coded signal. The correcting operation has five steps occurring at the 8th and 12th clocking pulses occurring after the reset pulse, the fifth step at the 13th clocking pulse being rationalization.

At the fifth correction step when the analog signal is above half the maximum amplitude the encoder is arranged to encode (FIGS. 8*a* and 8*c*) the counter either retains its existing count or counts down, i.e. count up is inhibited. When the analog signal is below half said maximum amplitude (FIG. 8*b*) the counter may retain its existing count or count up, i.e. count down is inhibited.

Half maximum amplitude is the zero of an A.C. signal input to the encoder consequently the first reference signal which if retained indicates a signal at or above half maximum amplitude indicates the polarity of the A.C. signal sample being encoded.

Figure 9:
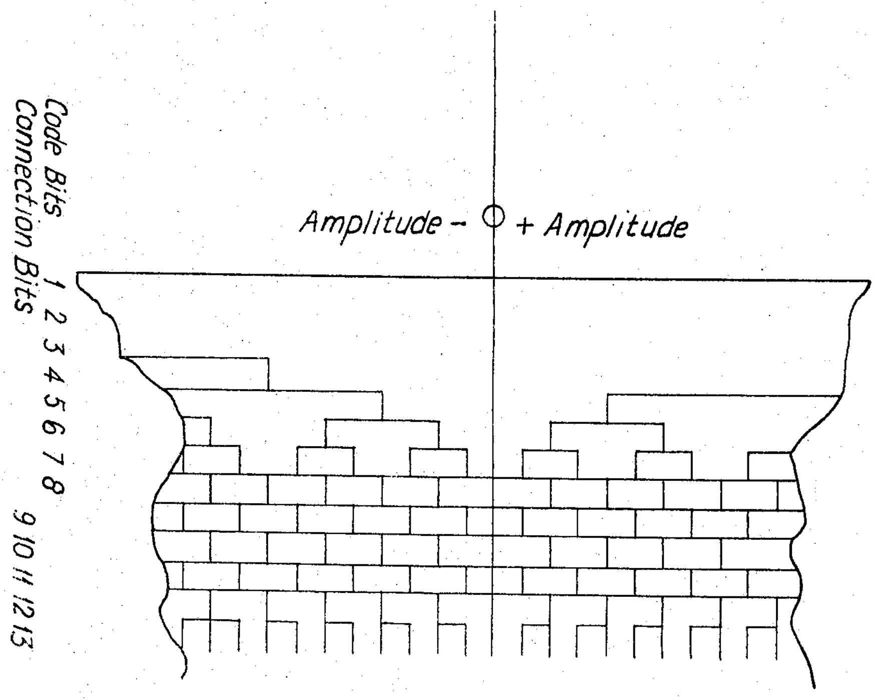
FIG. 9 is a diagram illustrating the operation of the encoder of FIG. 2.

The rationalization step produces a zero count and so permits the up-down counter to produce a final count in units which are half the units of the count inserted during the loading operation of the first half of the encoding cycle. This is illustrated in FIG. 9.

The inhibition of the count is controlled by the sampling gate which inhibits count up pulses when the first digit of the code is logical 1 and inhibit count down pulses when the first digit of the code is logical 0.

The counter is prevented from running its maximum count and so producing a false low code by a signal from its output circuit.

The output circuit in this embodiment includes a parallel to series convertor to produce the code successively from the counter outputs and also produces the series code in reflected binary form. The circuitry required is known and is not described further herein.

In reflected binary codes the encoding of maximum positive signal differs only from the maximum negative signal by the condition of the polarity bit, all other bits having the condition logical 1. The logic circuitry to produce the signal to prevent overrun is therefore a multiple AND gate whose inputs are the 2nd to 8th code digits.

Figure 8E:
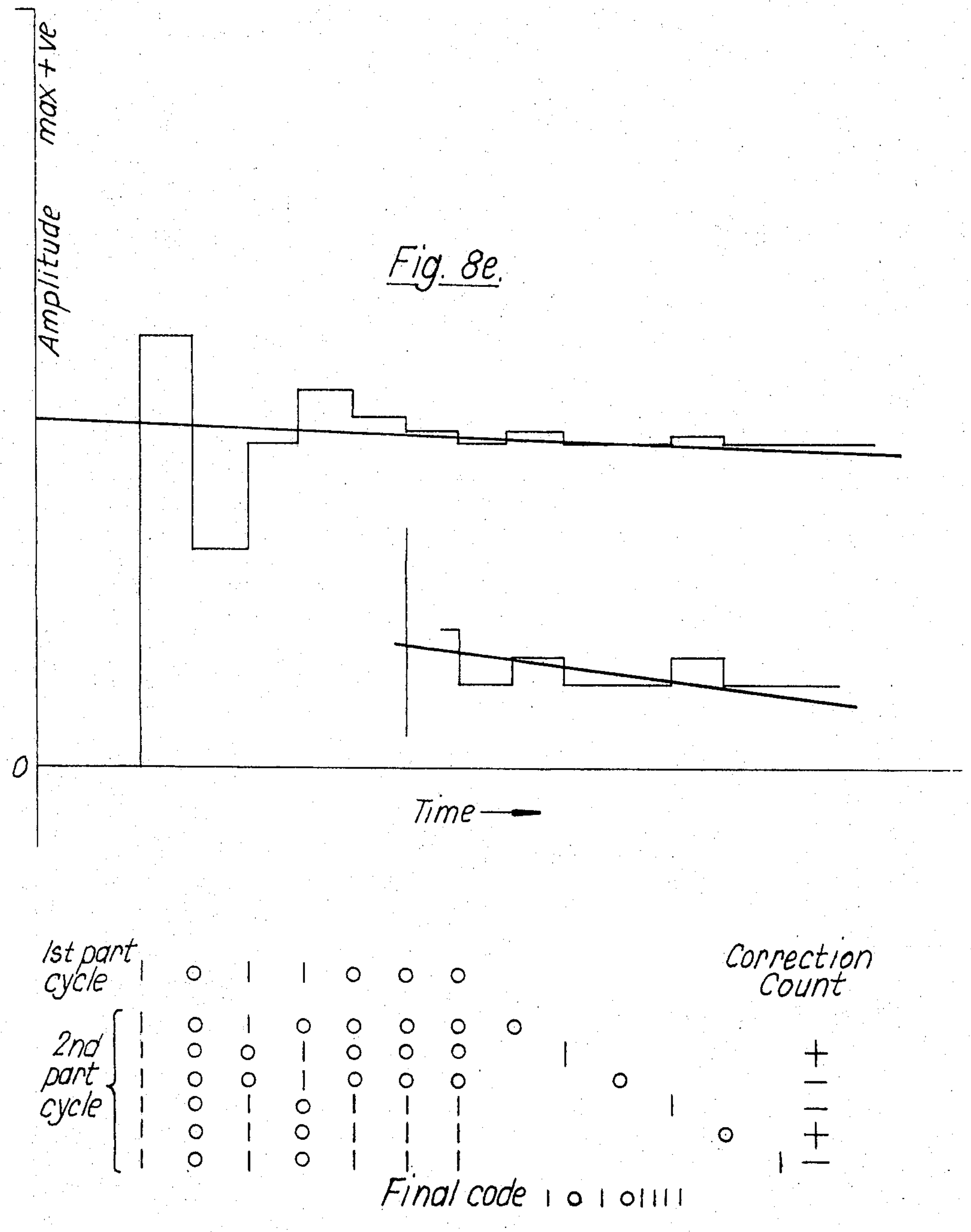
Figure 8F:
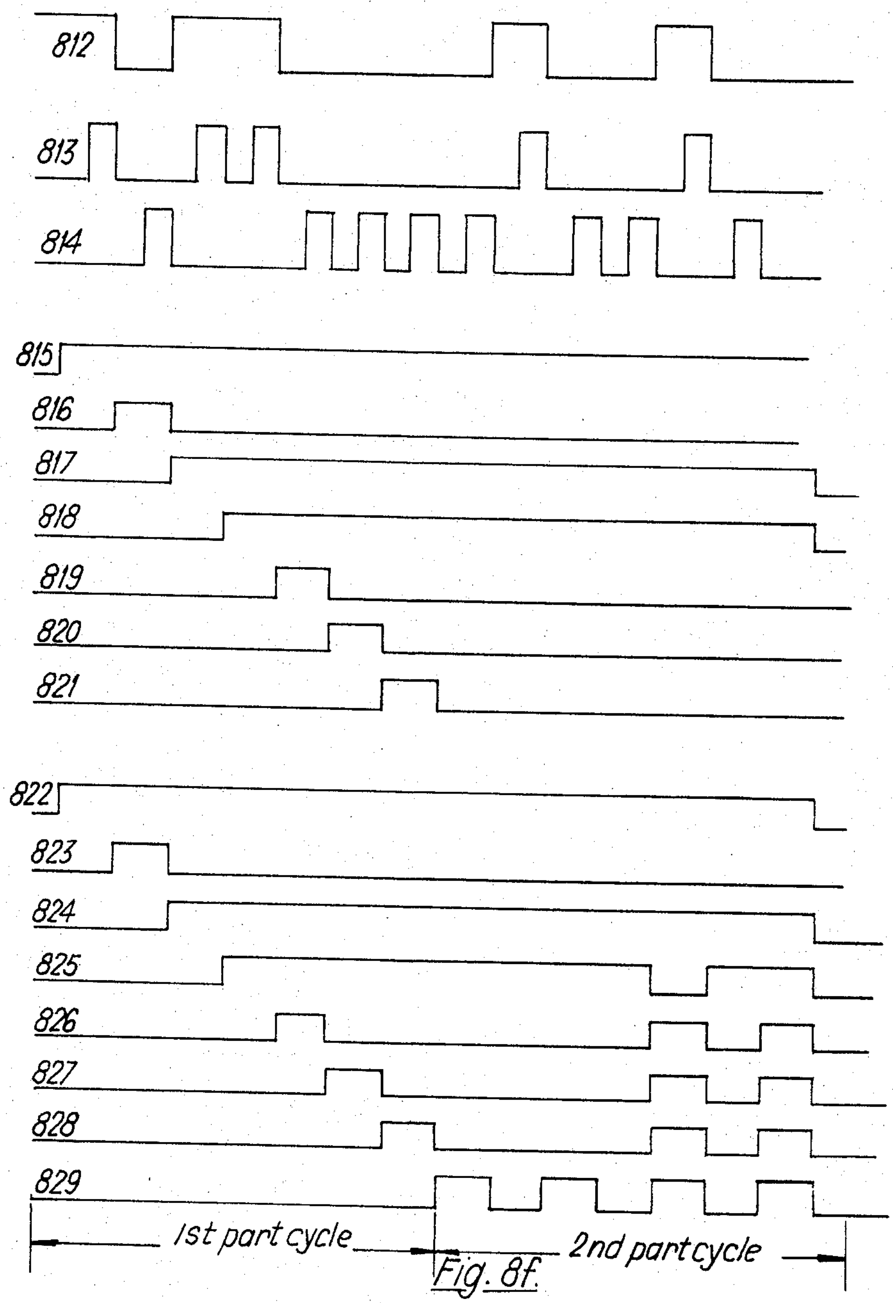

FIGS. 8*c* and *d* show the waveforms and data when the input signals 811 has a ripple at its commencement and FIG. 8*e* and *f* show the waveforms and data when the input signal drops steadily during the encoding cycle. In the error correction cycle therefore the encoder can correct up to 5 digits positive or negative and if the correction is complete before the 4th digit the encoder hunts plus or minus 1 digit about the true level.

As alternatives to the circuitry for the error encoder previously described which uses negative logic circuitry it is possible to use positive logic circuitry and in either case any known form of bistable circuit may be used as an alternative to the JK flip-flops, e.g. saturable ferrite cores or the switching glasses may be used.

It is not essential to use eight bits or to use the binary code, but it is essential that the duration of the encoding cycle be equal to or less than the duration of the code signal produced if only one encoder is to be used. Alternative methods of operation are also possible. All the digits of the code could be generated during the first part of the cycle and the final rationalization step omitted in the error correction cycle.

The encoder can work either on an analog signal input or on a pulse signal input and generally the encoder will be timed shared between a number of different input signal sources, in which case a sample of each input source signal is taken cyclically. Each sampling period has a duration equal to that of an encoder cycle duration and it is taken by switching the comparator input successively to the outputs of the signal sources. The encoder can compensate for errors due to decisions taken early in the decoding cycle and which have a major effect on the amplitude encoded. It is particularly applicable to multiplex telecommunication circuits e.g. multi-channel telephony. It is an advantage of this type of encoder that it can correct the errors due to the switching surges caused by multiplexing since these usually affect the start of the sample and consequently the start of the encoding cycle during which the most significant code digits are produced.

In a particular example of an encoder as described with reference to FIG. 2 for operation in a multiplex telephone system the basic timing oscillator 11 had a frequency of 8.192 MHz. The output circuit included a parallel to series convertor and produced a reflected binary code. The control signal for the transmitted bit rate corresponding to signal 311 of FIG. 3 applied to the series parallel convertor had a frequency of 2.048 MHz. The encoding cycle time was equal to the time slot in the transmitted signal occupied by the code produced during the cycle and was 1/256 second. The synchronizing signals required by the system were also inserted between appropriate code groups by the output circuitry.

While we have described above the principles of our invention in connection with specific apparatus it is to be clearly understood that this description is made only by way of example and not as a limitation to the scope of our invention as set forth in the objects thereof and in the accompanying claims.

We claim:

1. An error correcting encoder comprising:
an encoder input for input analog signals having an information containing parameter to be encoded;
first means to generate an initial code signal representative of said parameter;
second means coupled to said first means to produce an analog replica of said initial code signal;
third means coupled to said encoder input and said second means to produce an error signal when said analog replica and said input analog signals differ; and
fourth means coupled to said first means and said third means responsive to said error signal to correct said initial code signal and produce an error corrected output code signal.

2. An encoder according to claim 1, wherein
said first means includes
a code generator coupled to said encoder input to produce said initial code signal, and
a storage means coupled to said code generator to store said initial code signal.

3. An encoder according to claim 1, wherein
said second means includes
a decoder coupled to said first means to produce said analog replica.

4. An encoder according to claim 1, wherein
said third means includes
an analog comparison circuit coupled to said encoder input and the output of said second means to produce said error signal.

5. An encoder according to claim 1, wherein
said fourth means includes
an error correcting circuit coupled to said first means and said third means responsive to said error signal to correct said initial code signal and to produce said error corrected output code signal.

6. An encoder according to claim 1, wherein
said first means includes
a code generator coupled to said encoder input to produce said initial code signal, and
a storage means coupled to said code generator to store said initial code signal;
said second means includes
a decoder coupled to said storage means to produce said analog replica;
said third means includes
an analog comparison circuit coupled to said encoder input and the output of said decoder to produce said error signal; and
said fourth means includes an error correcting circuit coupled to said storage means and said comparison circuit responsive to said error signal to correct said initial code signal stored in said storage means and to produce said error corrected output code signal.

7. An encoder according to claim 1, wherein
said first means, said second means and said third means cooperate to produce a high order reference signal, to store said high order reference signal when said error signal has a first given condition, to reject said high order reference signal when said error signal has a second given condition different than said first given condition, to produce a lower order reference signal, to store said lower order reference signal when said error signal has said first given condition, to reject said lower order reference signal when said error signal has said second given condition, to successively produce lower order reference signals, to successively store each of said lower order reference signals when said error signal has said first given condition, and to successively reject each of said lower order reference signals when said error signal has said second given condition; and
said initial code signal includes those reference signals that are stored.

8. An encoder according to claim 7, wherein
said fourth means corrects said stored reference signals by appropriately adding and subtracting successive ones of lower order reference signals to and from preceding reference signals; and
said error corrected output code signals are produced from said corrected stored reference signals.

9. An encoder according to claim 8, wherein
said fourth means generates a lowest order reference signal and performs a first final correction to said stored reference signals by adding said lowest order reference signal to previously stored reference signals or rejecting said lowest order reference signal in response to certain predetermined conditions of said error signal, and performs a second final correction to said stored reference signals by subtracting said lowest order reference signal from previously stored reference signals or rejecting said lowest order reference signal in response to other predetermined conditions of said error signal.

10. An encoder according to claim 9, wherein
said fourth means performs said first final correction if at the penultimate correction said initial code signal has a value which is below the level of the highest order reference signal and said second final correction if at the penultimate correction said initial code signal has a value which is above the level of the highest order reference signal.

11. An encoder according to claim 1, wherein
said first means and said fourth means includes
a reference signal generating circuit,
a storage circuit coupled in tandem to said generating circuit,
an error correcting circuit coupled in tandem to said storage circuit,
an output circuit coupled in tandem to said correcting circuit, and
a timing circuit connected to said generating circuit, said storage circuit, said correcting circuit and said output circuit to time the operation thereof;
said second means includes
a decoder coupled to said storage circuit to produce said analog replica; and
said third means includes
a comparator circuit having one input coupled to said encoder input, another input coupled to the output of said decoder and an output to couple said error signal to said timing circuit;
said generating circuit producing reference signals for representing the value of said parameter during a predetermined time interval;
said storage circuit storing required ones of said reference signals as said initial code signal and applying said stored ones of said reference signals to said correcting circuit;
said timing circuit responding to said error signal to produce control signals;
said correcting circuit responding to said control signals to alter said initial code signal so that said stored reference signals represent more accurately the value of said parameter; and
said output circuit produces said error corrected output code signal from said corrected stored initial code signal.

12. An encoder according to claim 11, wherein
said generating circuit produces binary code signals having binary digits representing successively decreasing values of said parameter, each of said digits being present at a different output of said generating circuit; and
said storage circuit only stores the highest value binary signal in response to a first control signal produced by said timing circuit in response to said error signal indicating that said parameter of said input analog signal is greater than said parameter of said analog replica and to a second control signal produced by said timing circuit in response to said error signal indicating that said parameter of said input analog signal is less than said parameter of said analog replica.

13. An encoder according to claim 12, wherein
said correcting circuit includes
a counting circuit.

14. An encoder according to claim 13, wherein
during a first part of an encoding cycle said generating circuit generates a given number of said digits for the remainder of said encoding cycle in response to said first control signal, and
during a second part of said encoding cycle said counting circuit is loaded with said given number of said digits and after loading adds each of a plurality of binary unit steps in response to one of said first and second control signals and subtracts each of a plurality of binary unit steps in response to the other of said first and second control signals.

15. An encoder according to claim 14, wherein
said output circuit produces said error corrected output code signal as a succession of digits in series, and
said encoding cycle is controlled by said timing circuit to have a duration substantially equal to the duration of said error corrected output code signal produced by said output circuit.

* * * * *